United States Patent
Sano et al.

(10) Patent No.: US 8,209,345 B2
(45) Date of Patent: Jun. 26, 2012

(54) USER INFORMATION MANAGEMENT DEVICE FOR CONTENT PROVISION, PROCESSING METHOD, AND COMPUTER-READABLE NON TRANSITORY STORAGE MEDIUM STORING PROGRAM

(75) Inventors: Takeshi Sano, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/017,374

(22) Filed: Jan. 31, 2011

(65) Prior Publication Data

US 2011/0208765 A1  Aug. 25, 2011

(30) Foreign Application Priority Data

Feb. 23, 2010 (JP) ................................ 2010-36835

(51) Int. Cl.
 G06F 7/00 (2006.01)
 G06F 17/30 (2006.01)
(52) U.S. Cl. ...................................................... 707/758
(58) Field of Classification Search ........................ None
 See application file for complete search history.

(56) References Cited

U.S. PATENT DOCUMENTS

| 7,788,271 B2 * | 8/2010 | Soma et al. | 707/758 |
| 2005/0273399 A1 * | 12/2005 | Soma et al. | 705/26 |
| 2010/0162095 A1 * | 6/2010 | Tsujii et al. | 715/234 |

FOREIGN PATENT DOCUMENTS

| JP | 2005-031966 A | 2/2005 |
| JP | 2007-219636 A | 8/2007 |

* cited by examiner

*Primary Examiner* — Ann Chempakaseril
(74) *Attorney, Agent, or Firm* — Fujitsu Patent Center

(57) ABSTRACT

A user information management device configured to manage user information regarding content provision service users, and to provide a content acquisition method to a user client device, the user information management device includes, a user information storage unit configured to store user information for each user, the user information including an address of the content acquisition method and attribute information including a user's attributes using attribute values classified into predetermined attribute categories; an access attribute information storage unit configured to store access attribute information for each set of content; a content provision unit that acquires from the user information storage unit, a content provision request including content information; an access acquisition unit configured such that, upon receiving a content acquisition request from the user client device including content information, attribute criteria, and user attribute information.

14 Claims, 20 Drawing Sheets

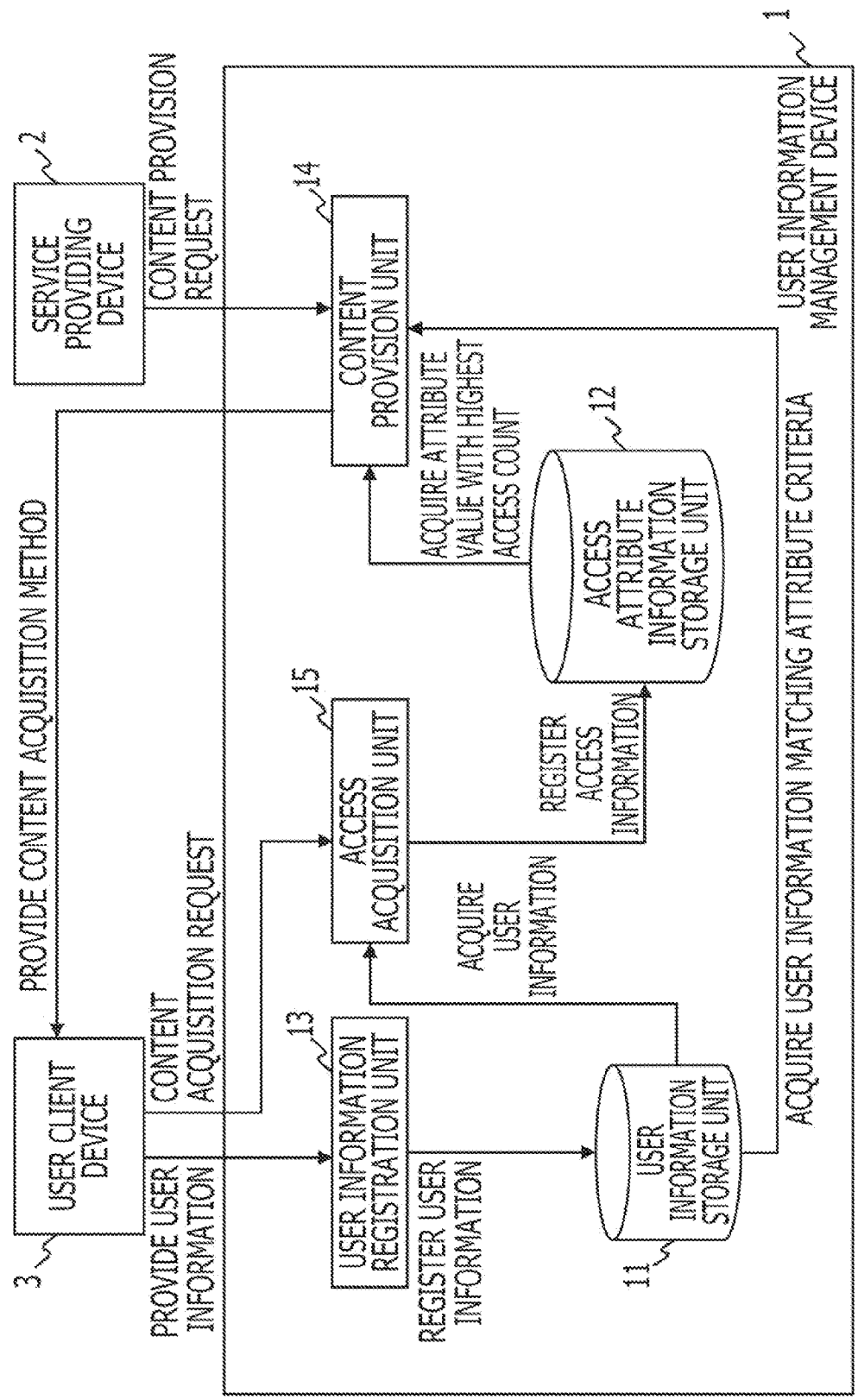

FIG. 2

| USER ID | NAME | POSITION | POSITION (L1) | POSITION (L2) | INTERESTS | INTERESTS (L1) | |
|---|---|---|---|---|---|---|---|
| 001 | AA | K STATION | K WARD | K CITY | BASEBALL | SPORTS | ~ |
| 002 | BB | K DAISHI STATION | K WARD | K CITY | READING | INDOOR | ~ |
| 003 | CC | K STADIUM | K WARD | K CITY | FISHING | OUTDOOR | ~ |
| 004 | DD | K STATION | K WARD | K CITY | WATCHING BASEBALL | SPORTS | ~ |
| 005 | EE | K DAISHI STATION | K WARD | K CITY | TENNIS | SPORTS | ~ |
| 006 | FF | K STATION | K WARD | K CITY | SOCCER | SPORTS | ~ |
| 007 | GG | K STADIUM | K WARD | K CITY | WATCHING SOCCER | SPORTS | ~ |
| 008 | HH | K STATION | K WARD | K CITY | GO | GAMES | ~ |
| 009 | II | K DAISHI STATION | K WARD | K CITY | SHOGI | GAMES | ~ |
| 010 | JJ | K RACECOURSE | K WARD | K CITY | HORSE RACING | GAMES | ~ |
| 011 | KK | K STATION | K WARD | K CITY | BASEBALL | SPORTS | ~ |
| ~ | ~ | ~ | ~ | ~ | ~ | ~ | ~ |

| CONTENT | ATTRIBUTE CRITERIA | ACCESS ATTRIBUTE VALUE (ACCESS COUNT) |
|---|---|---|
| http://www.sports.com/baseball.html | INTERESTS=BASEBALL | SOFTBALL (10) |
| http://www.music.com/rock.html | FAVORITE MUSIC=ROCK | POP(20) PUNK(5) |
| http://www.yokohama.com/soccer.html | POSITION=Y STATION INTERESTS=SOCCER | MM STATION & WATCHING SOCCER (5) |
| ~ | ~ | ~ |

FIG. 5

```
MESSAGE TYPE: CONTENT PROVISION REQUEST
ADDRESS OF SERVICE PROVIDING DEVICE: xxx.xxx.xxx.xxx
CONTENT URL: http://www.sample.com/sample.html
ATTRIBUTE CRITERIA: POSITION=K STATION
```

FIG. 6

```
MESSAGE TYPE: CONTENT ACQUISITION METHOD
ACCESS URL:
http://yyy.yyy.yyy.yyy?contentUrl=htt://www.example.com/
sample.html&userid=001&position=k station
```

FIG. 7

```
MESSAGE TYPE: CONTENT ACQUISITION REQUEST
CONTENT URL:http://www.example.com/sample.html
ATTRIBUTE CRITERIA: POSITION=K STATION
USER ID: 001
```

FIG. 8

| CONTENT | ATTRIBUTE CRITERIA | ACCESS ATTRIBUTE VALUE (ACCESS COUNT) |
|---|---|---|
| Http://www.sample.com/sample.html | POSITION=K STATION | K DAISHI STATION (1) |
| http://www.sports.com/baseball.html | INTERESTS=BASEBALL | SOFTBALL (10) |
| http://www.music.com/rock.html | FAVORITE MUSIC=ROCK | POP(20) PUNK(5) |
| http://www.yokohama.com/soccer.html | POSITION=Y STATION INTERESTS=SOCCER | MM STATION & WATCHING SOCCER (5) |
| ~ | ~ | ~ |

| CONTENT | ATTRIBUTE CRITERIA | ACCESS ATTRIBUTE VALUE (ACCESS COUNT) |
|---|---|---|
| Http://www.sample.com/sample.html | POSITION=K STATION | K DAISHI STATION (4)<br>K STADIUM (1) |
| http://www.sports.com/baseball.html | INTERESTS=BASEBALL | SOFTBALL (10) |
| http://www.music.com/rock.html | FAVORITE MUSIC=ROCK | POP(20)<br>PUNK(5) |
| http://www.yokohama.com/soccer.html | POSITION=Y STATION<br>INTERESTS=SOCCER | MM STATION &<br>WATCHING SOCCER (5) |
| ~ | ~ | ~ |

MESSAGE TYPE: CONTENT PROVISION REQUEST
ADDRESS OF SERVICE PROVIDING DEVICE: xxx.xxx.xxx.xxx
SERVICE ID: SERVICE001
CONTENT URL: http://www.sample.com/sample.html
ATTRIBUTE CRITERIA: POSITION=K STATION

FIG. 14

MESSAGE TYPE: CONTENT ACQUISITION METHOD
ACCESS URL:
http://yyy.yyy.yyy.yyy?contentUrl=http://www.example.com/sample.html&serviceid=service001&userid=001&position=k station

FIG. 15

| CONTENT | ATTRIBUTE CRITERIA | ACCESS ATTRIBUTE VALUE (ACCESS COUNT) |
|---|---|---|
| SERVICE001 | POSITION=K STATION | K DAISHI STATION (4) K STADIUM (1) |
| SERVICE002 | INTERESTS=BASEBALL | SOFTBALL (10) |
| SERVICE003 | FAVORITE MUSIC=ROCK | POP(20) PUNK(5) |
| SERVICE004 | POSITION=Y STATION INTERESTS=SOCCER | MM STATION & WATCHING SOCCER (5) |
| ~ | ~ | ~ |

FIG. 16

```
MESSAGE TYPE: CONTENT PROVISION REQUEST
ADDRESS OF SERVICE PROVIDING DEVICE: xxx.xxx.xxx.xxx
CONTENT ID: CONTENT001
CONTENT URL: http://www.sample.com/sample.html
ATTRIBUTE CRITERIA: POSITION=K STATION
```

FIG. 17

```
MESSAGE TYPE: CONTENT ACQUISITION METHOD
ACCESS URL:
http://yyy.yyy.yyy.yyy?contentUrl=http://www.example.com/
sample.html&contentid=content001&userid=001&position=k station
```

FIG. 18

| CONTENT | ATTRIBUTE CRITERIA | ACCESS ATTRIBUTE VALUE (ACCESS COUNT) |
|---|---|---|
| CONTENT001 | POSITION=K STATION | K DAISHI STATION (4)<br>K STADIUM (1) |
| CONTENT002 | INTERESTS=BASEBALL | SOFTBALL (10) |
| CONTENT003 | FAVORITE MUSIC=ROCK | POP(20)<br>PUNK(5) |
| CONTENT004 | POSITION=Y STATION<br>INTERESTS=SOCCER | MM STATION &<br>WATCHING SOCCER (5) |
| ~ | ~ | ~ |

FIG. 22

MESSAGE TYPE: CONTENT ACQUISITION METHOD
ACCESS URL:
http://www.example.com/sample.html&
contentid=content001&userid=001&position=k station

FIG. 23

MESSAGE TYPE: ACCESS INFORMATION
CONTENT URL:Http://www.example.com/sample.html
ATTRIBUTE CRITERIA: POSITION=K STATION
USER ID:001

FIG. 24

| CONTENT | ATTRIBUTE CRITERIA | ACCESS ATTRIBUTE VALUE (ACCESS COUNT) |
|---|---|---|
| http://www.sample.com/sample.html | POSITION=K STATION | K DAISHI STATION (4)<br>K STADIUM (1) |
| http://www.sports.com | INTERESTS=BASEBALL | SOFTBALL (10) |
| CONTENT 1 | FAVORITE MUSIC=ROCK | POP (20)<br>PUNK (5) |
| SERVICE A | POSITION=Y STATION<br>INTERESTS=SOCCER | MM STATION &<br>WATCHING SOCCER (5) |
| http://www.test.com/test.html | POSITION=K STATION<br>INTERESTS=BASEBALL | K DAISHI STATION & SOFTBALL (10)<br>K DAISHI STATION & SOCCER (1) |
| ~ | ~ | ~ |

12

USER INFORMATION MANAGEMENT DEVICE FOR CONTENT PROVISION, PROCESSING METHOD, AND COMPUTER-READABLE NON TRANSITORY STORAGE MEDIUM STORING PROGRAM

CROSS-REFERENCE TO RELATED APPLICATION

This application is based upon and claims the benefit of priority of the prior Japanese Patent Application No. 2010-036835 filed on Feb. 23, 2010, the entire contents of which are incorporated herein by reference.

FIELD

A certain aspect of the embodiments disclosed herein relates to user information management processes for content provision.

BACKGROUND

There is steady growth in services that utilize information regarding personal purchasing histories and current position information to deliver content to users who match given parameters. Such services encompass the information providing services referred to as targeted advertising, for example.

On the other hand, conducting such services involves handling personal information in order to identify the range of information to provide. For this reason, it is important to protect user privacy so that individuals are not identified as a result of using the service.

In order to provide services that make use of personal information while also protecting the privacy of the persons receiving the service, a structure may be used wherein instead of having the service provider both manage and utilize personal information, a personal information administrator separate from the service provider manages personal information and intermediates between the service provider and the users. By using such a structure, it becomes possible to provide services based on personal information, without passing on personal information to the service provider.

However, problems such as the following still exist in the case of a model that separates the personal information administrator from the service provider.

Consider an example of a model wherein the service provider specifies user attribute criteria, receives user information matching the criteria from the personal information administrator, and provides services to those users. In this case, even if the received information does not include personal information, at least the attribute information specified in the criteria is passed to the service provider.

Consider an example of another model wherein the service provider specifies user attribute criteria, passes content access information to the personal information administrator. The personal information administrator then provides a delivery trigger for the content to users matching the specified attribute criteria, and the users access the content with respect to the service provider. In this case, personal information in and of itself is not passed to the service provider. However, when specifying criteria with respect to the content, if the attribute criteria are specified so as to reduce the number of users matching those criteria to an extremely small number, then when users acquire the content, the accessing users will be known to match those attributes. In other words, if content is provided by specifying fine-grained attribute criteria with few potential matches, then user anonymity might not be sufficiently protected.

Given the above problems, technologies have been established that make it difficult to identify users by delivering content to at least a certain number of users. For example, Japanese Laid-open Patent Publication No. 2007-219636 discloses a method for disclosing data to users on the basis of user presence as recorded by a camera. In this method, when a user information administrator receives a personal information acquisition request (more specifically, a request to search users recorded at a particular time of witnessing) from a service provider that discloses data, and if the number of users who match the time of witnessing is not at least a certain number, then the time of witnessing is change to a time frame of witnessing, and information for at least a certain number of users found by search is provided to the service provider.

Additionally, Japanese Laid-open Patent Publication No. 2005-031966 discloses a method for receiving presence information provided by an information provider, and providing presence information with abstracted attribute values in response to requests from users. In this method, if the number of users to be provided does not satisfy a certain number, then the level of abstraction with respect to the position information of the users using the service is raised, users matching the criteria are acquired, and presence information is provided.

In the technology disclosed in Japanese Laid-open Patent Publication No. 2007-219636, consider the example of a personal information acquisition request issued with "3:30 PM" set as the time of witnessing. In this case, if there is only one matching user, the anonymity of that user cannot be guaranteed. However, if the granularity of the attribute value is changed to "3:01~6:00 PM" and the number of matching users is increased to 10, for example, then user information may be provided to a service provider while protecting user anonymity.

However, since the criteria (e.g., the time of witnessing) are changed in the technology disclosed in Japanese Laid-open Patent Publication No. 2007-219636, user information found using past information is provided in cases where other additional criteria (position information) are specified. As a result, the service provider acquires information that differs from the user information for the time when the service was provided. More specifically, if criteria are set such that the time of witnessing is 3:30 PM and the location is X, there will exist users in the provided user information who had already left location X prior to the time of witnessing 3:30 PM.

Furthermore, even with the technology disclosed in Japanese Laid-open Patent Publication No. 2005-031966, the range of position information set as the criteria is extended by raising the abstraction level. For this reason, the many of the users matching the extended criteria will have little relation to the information to be provided.

Consequently, when methods similar to the related art discussed above are used and the range of criteria specifying target users is over-extended, information will be provided even to users who have no need of the information.

Up until now, a process has not been realized for extending the range of user-specifying criteria so as to satisfy a certain minimum number of users for preserving user anonymity, while also determining a suitable range such that the range does not become overly broad.

SUMMARY

In accordance with an aspect of the embodiments, a user information management device configured to manage user information regarding content provision service users, and to provide a content acquisition method to a user client device, the user information management device includes, a user information storage unit configured to store user information for each user, the user information including an address of the content acquisition method and attribute information including a user's attributes using attribute values classified into predetermined attribute categories; an access attribute information storage unit configured to store access attribute information for each set of content, the access attribute information including attribute criteria specifying the attributes of users to be provided with the content and access attribute values indicating the user access counts for each attribute value specified by the attribute criteria based on the attribute values included in the user information regarding users who transmitted acquisition requests for the content; a content provision unit that acquires a content provision request including content information, which indicates content to be provided to users and the attribute criteria for that content, acquires, from the user information storage unit, user information that matches the attribute criteria included in the content provision request, wherein when the number of users corresponding to the extracted user information does not satisfy a predetermined number, the content provision unit specifies attribute values one at a time in order of highest access count from the access attribute values in the access attribute information stored in the access attribute information storage unit, and acquires user information that matches expanded attribute criteria to which the specified attribute value has been added as a logical disjunction parameter, when the number of users corresponding to the acquired user information does satisfy the predetermined number, the content provision unit generates a content acquisition method including access information for accessing the content indicated by the content information, and transmits the generated content acquisition method to addresses respectively extracted from the acquired user information; and an access acquisition unit configured such that, upon receiving a content acquisition request from a user client device including content information, attribute criteria, and user attribute information, the access acquisition unit causes the user client device to acquire the content requested in the content acquisition request, totals the user access counts for each attribute value specified by the attribute criteria of the content in the content acquisition request from the user attribute information included in the content acquisition request, generates access attribute information including the totaled access counts for each attribute value, and stores the generated access attribute information in the access attribute information storage unit.

The object and advantages of the invention will be realized and attained by at least the features, elements, and combinations particularly pointed out in the claims. It is to be understood that both the foregoing general description and the following detailed description are exemplary and explanatory and are not restrictive of the various embodiments, as claimed.

BRIEF DESCRIPTION OF DRAWINGS

These and/or other aspects and advantages will become apparent and more readily appreciated from the following description of the embodiments, taken in conjunction with the accompanying drawings of which:

FIG. 1 illustrates an example configuration of a user information management device disclosed as one configuration of the present embodiment;

FIG. 2 illustrates an example data structure of user information stored in a user information storage unit;

FIG. 3 illustrates an example of access attribute information stored in an access attribute information storage unit;

FIG. 5 illustrates an example of a content provision request in the first embodiment;

FIG. 6 illustrates an example of a content acquisition method message in the first embodiment;

FIG. 7 illustrates an example of a content acquisition request message in the first embodiment;

FIG. 8 is a diagram for explaining how access attribute values are added;

FIG. 9 illustrates an example of access attribute information after initial content provision;

FIG. 13 illustrates an example of a content provision request message in the second embodiment;

FIG. 14 illustrates an example of a content acquisition request message in the second embodiment;

FIG. 15 illustrates an example of access attribute information in the second embodiment;

FIG. 16 illustrates an example of a content provision request message in the third embodiment;

FIG. 17 illustrates an example of a content acquisition request message in the second embodiment;

FIG. 18 illustrates an example of access attribute information in the third embodiment;

FIG. 22 illustrates an example of a content acquisition method message in the fifth embodiment;

FIG. 23 illustrates an example of an access information message in the fifth embodiment;

FIG. 24 illustrates an example of access attribute information in the sixth embodiment.

DESCRIPTION OF EMBODIMENTS

Figure 4:
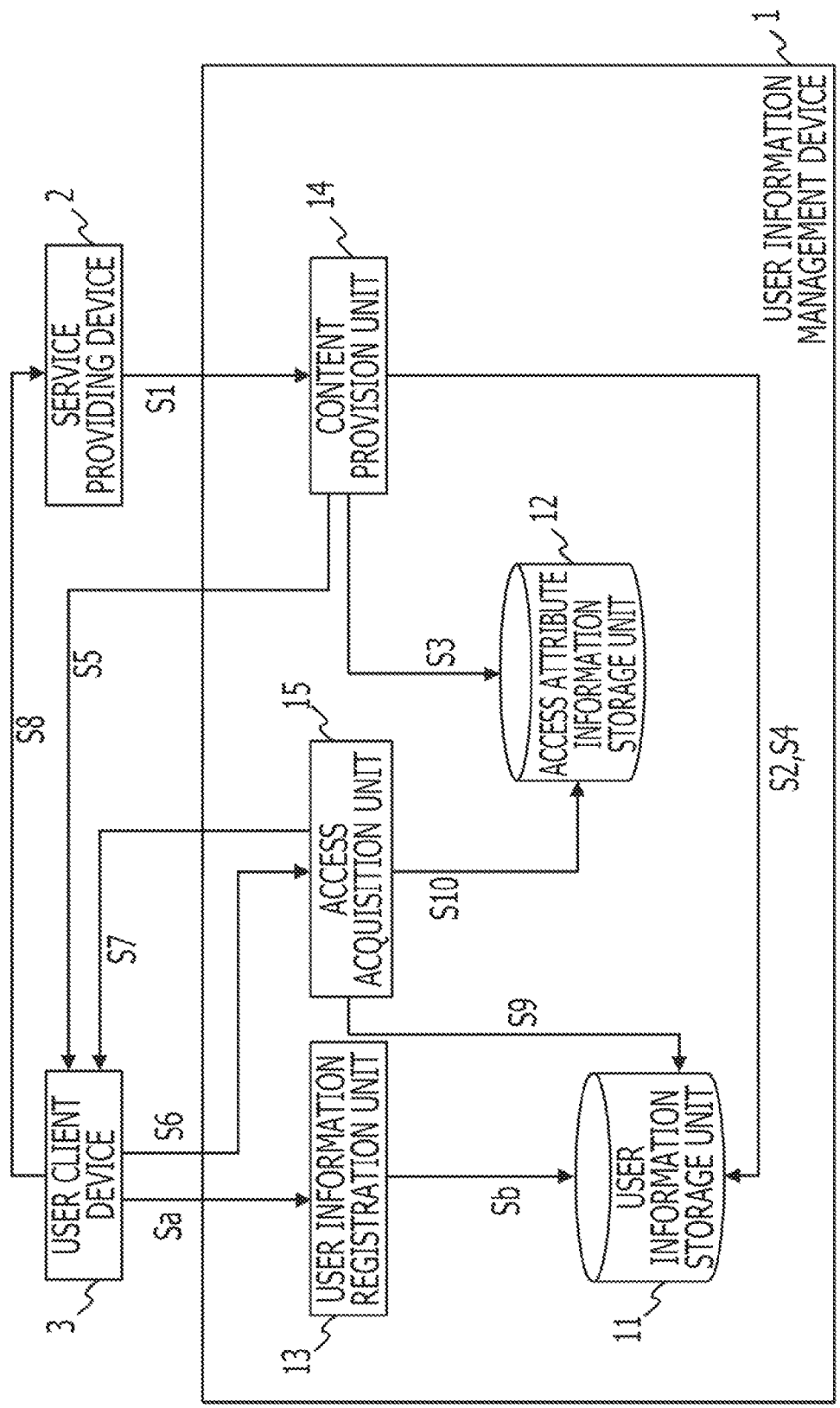
FIG. 4 illustrates the flow of processing by a user information management device in the first embodiment.

FIG. 1 illustrates an example configuration of a user information management device disclosed as one configuration of the present embodiment.

The user information management device 1 is provided with functions for communicating data with a service providing device 2 and a user client device 3 via a network. The user information management device 1 manages user information regarding users who use content provision services, and transmits a method for acquiring content provided by the service providing device 2 to the user client device 3 used by a user. The network herein is a medium for communication various data, such as the Internet, for example.

The service providing device 2 provides content to registered users.

The user client device 3 is a client device used by a user. For example, the user client device 3 may be a mobile phone, PDA, or computer that may be portably carried by a user.

The user information management device 1 is provided with a user information storage unit 11, an access attribute information storage unit 12, a user information registration unit 13, a content provision unit 14, and an access acquisition unit 15.

The user information storage unit 11 stores user information regarding users who use content provided by the service providing device 2.

The user information includes user-identifying information (e.g., a user ID), a content acquisition method address, and user attribute information for each user.

The address herein indicates a destination to which to transmit a content acquisition method message, and may be information indicating the user client device 3 (such as an email address, for example). The user ID may also double as the address.

The attribute information indicates user attributes by attribute values individually set for predetermined attribute categories.

FIG. 2 illustrates an example data structure of user information stored in the user information storage unit 11. The user information includes the following fields: a "User ID" field set with the user-identifying information; a "Name" field set with the username; and several attribute category fields set with attribute values, such as "Position", "Position (L1)", "Position (L2)", Interests", and "Interests (L1)".

The user ID, name, and attribute values in the user information is acquired and set by a process executed by the user information registration unit 13 and hereinafter described.

The attribute values are defined so as to be classified under predetermined attribute categories. For example, attribute values such as "Teen", "Twenties", and "Thirties" are classified under the attribute category "Generation", while the attribute values "Male" and "Female" are classified under the attribute category "Gender".

The attribute categories may also be set in a multilayer structure for different abstraction levels. For example, in the attribute information regarding a user's current position, the name of the train station positioned closest to the user's current position may be set as an attribute value for the attribute category "Position". Meanwhile, the attribute categories "Position (L1)" and "Position (L2)" may be set as upper-level abstraction levels (e.g., levels with a higher degree of abstraction) for the attribute category "Position". In this case, an attribute value (Ward) indicating the governmental district including the "Position" attribute value (Station) may be set as the attribute value for the upper-level attribute category "Position (L1)". Additionally, the name of the city or other governmental zone including the attribute value (Ward) set for "Position (L1)" may be set as the attribute value (City) for the next higher attribute category "Position (L2)".

Furthermore, if attribute information regarding a user's interests is set in a multilayer structure, then attribute categories such as "Interests" and "Interests (L1)" may be similarly set. If attribute values such as "Baseball", "Soccer", "Tennis", "Softball", "Reading", "Fishing", "Watching Baseball", "Go", "Shogi", and "Horse Racing" are set for the attribute category "Interests", then the attribute value "Sports" may be set for the upper-level attribute category "Interests (L1)" above particular attribute values such as "Baseball", "Soccer", "Tennis", and "Softball". Likewise, the attribute value "Games" may be set for the upper-level attribute category "Interests (L1)" above particular attribute values such as "Go", "Shogi", and "Horse Racing".

For each set of content, the access attribute information storage unit 12 stores the attribute values registered in the user information of users who have transmitted content acquisition requests for that particular content to the user information management device 1. In addition, the access attribute information storage unit 12 also stores access attribute information, which indicates the access counts for each attribute value.

FIG. 3 illustrates an example of access attribute information stored in the access attribute information storage unit 12. The access attribute information includes the following fields: a "Content" field set with information identifying or specifying a particular set of content; a "Attribute Criteria" field set with attribute criteria specified by predetermined attribute values; and an "Access Attribute Value (Access Count)" field set with the access counts of users having attribute values belonging to the one or more attribute categories specified as the attribute criteria. Access counts are specified individually for each attribute value.

In the access attribute information illustrated in FIG. 3, the URLs of content to be provided are set in the "Content" field. However, the "Content" field may also be set with a content ID (e.g., identification information regarding particular content) or a service ID (e.g., identification information regarding particular services to be provided).

In the access attribute information illustrated in FIG. 3, the first line (e.g., the first record) includes the attribute criteria "Interests=Baseball". These criteria indicate that the range of content provision is limited to users having the attribute value "Baseball" under the attribute category "Interests" in their user information.

The "Access Attribute Value" field indicates that, among the attribute values under the attribute category (Interests) specified by the content attribute criteria, users having the attribute value "Softball" have accessed the corresponding content 10 times.

Upon receiving a user information message transmitted from a user client device 3, the user information registration unit 13 generates user information including the user ID and user attribute information included in the message, and registers the user information in the user information storage unit 11. In addition, if attribute categories are multilayered, then the user information registration unit 13 also specifies attribute values for upper-level attribute categories from the user attribute values included in the provided user information, and registers the specified values as part of the user information.

From the service providing device 2, the content provision unit 14 acquires content information indicating the content to be provided, as well as a content provision request including the attribute criteria which specify, by attribute values, the users to be provided with content. In addition, from the user information storage unit 11, the content provision unit 14 extracts the user information that matches the attribute values specified by the acquired attribute criteria.

If the amount of extracted user information (e.g., if the number of users) does not satisfy a predetermined number, then the content provision unit 14 examines the access attribute information in the access attribute information storage unit 12, and specifies the attribute value with the highest access count from among the attribute values that belong to the one or more attribute categories specified in the attribute criteria. The specified attribute value is then added to the attribute criteria as a logical disjunction (OR) parameter, and users matching the expanded attribute criteria are extracted from the user information in the user information storage unit 11.

The content provision unit 14 determines whether or not the number of users matching the attribute criteria satisfies a certain number. If the number of matching users still does not meet the certain number after adding all relevant attribute values to the attribute criteria on the basis of the access attribute information in the access attribute information storage unit 12, or if there are no user access counts, such as when providing content for the first time, then the content provision unit 14 changes the attribute values to the attribute values belonging to the upper-level attribute categories above the one or more attribute categories specified in the attribute criteria. In other words, the content provision unit 14 switches to attribute values exiting on a higher abstraction level, and acquires user information matching the modified attribute criteria.

If the number of acquired users satisfies the predetermined number according to the OR-expanded attribute criteria or the modified attribute criteria, then the content provision unit 14 generates a content acquisition method message, and transmits the message to respective user addresses (e.g., respective user client device 3) specified from the acquired user information.

Each content acquisition method message includes: content information regarding the offered content; attribute criteria; a corresponding user ID; and content access information in which the access address is taken to be the access acquisition unit 15 of the user information management device 1.

Additionally, the access information may also take the form of a content acquisition method created by the content provision unit 14, in which the access address is taken to be the service providing device 2 that stores the offered content.

Instead of generating a content acquisition method, the content provision unit 14 may also notify the service providing device 2 of the user IDs/addresses in the user information acquired by the attribute criteria. In this case, the service providing device 2 transmits a content acquisition method message to each user client device 3, with each message including access information indicating the address of a service providing device.

Furthermore, as described later, the access acquisition unit 15 may also generate access attribute information by acquiring access information related to accessing content provided by the service providing device 2.

Upon receiving a content acquisition request from a user client device 3, the access acquisition unit 15 transmits the content corresponding to the content information in the received content acquisition request to the user client device 3.

For example, if a content acquisition request specifying the access acquisition unit 15 as the access address is received from the user client device 3, then the access acquisition unit 15 redirects that acquisition request to the service providing device 2 storing the content (e.g., a redirect process).

Alternatively, the access acquisition unit 15 may acquire content from the service providing device 2 on the basis of a received content acquisition request, and then transmit the acquired content to a user client device 3 (e.g., a proxy process).

The access acquisition unit 15 also generates access attribute information including content information, as well as access counts for each attribute value related to the attribute criteria for that content information. Access attribute information thus generated is stored in the access attribute information storage unit 12.

The access attribute information includes content information, attribute criteria, and access attribute values for each set of accessed content. The access attribute values are set with access counts for each attribute value belonging to the one or more attribute categories specified by the attribute criteria, and which were acquired from the user information of the users who transmitted a content acquisition request.

For example, for each content acquisition request, the access acquisition unit 15 may use the content information, user ID, and attribute criteria included in the acquisition request to acquire the attribute values belonging to the one or more attribute categories specified by the attribute criteria from the user information corresponding to the user IDs in the user information storage unit 11. The access acquisition unit 15 may then increment the access counts of the attribute values specified by the access attribute information corresponding to the content information in the access attribute information storage unit 12.

Alternatively, in the case where a content acquisition method specifying the service providing device 2 as the access address is transmitted, the access acquisition unit 15 may acquire content information, attribute criteria, and access information including the user IDs of accessing users from the service providing device 2. The access acquisition unit 15 may then acquire the attribute values belonging to the attribute categories specified by the attribute criteria from the user information corresponding to the user IDs in the user information storage unit 11, and total the access counts of the respective attribute values in the access attribute information corresponding to the content information in the access attribute information storage unit 12.

The user information management device 1 conducts the following processing by the above storage units and processing units.

Upon receiving a user information message from a user client device 3, the user information registration unit 13 generates user information wherein the username, attribute values, and other attribute information included in the user information message is assigned to a user ID. The generated user information is then stored in the user information storage unit 11.

Upon receiving a content provision request including content information and attribute criteria from the service providing device 2, the content provision unit 14 uses the attribute criteria in the content provision request as a basis for acquiring user information that matches the attribute values in the attribute criteria from the user information in the user information storage unit 11.

If the amount of acquired user information (e.g., if the number of users) does not satisfy a predetermined number, then from the access attribute information in the access attribute information storage unit 12, the content provision unit 14 retrieves the attribute value with the highest access count from among the attribute values belonging to the one or more attribute categories specified by the attribute criteria in the content provision request. The retrieved attribute value is then added to the attribute criteria as a logical disjunction (OR) parameter. On the basis the new criteria expanded with the logical disjunction (OR) parameter, users matching the expanded attribute criteria are extracted from the user information in the user information storage unit 11.

If the number of users acquired by the expanded attribute criteria does not satisfy the predetermined number, then the content provision unit 14 may repeat the above process. In other words, from the access attribute information, the content provision unit 14 may retrieve the attribute value with the next highest access count from among the attribute values belonging to the one or more attribute categories specified by the attribute criteria. The retrieved attribute value may then be added to the attribute criteria as a logical disjunction (OR) parameter, and additional user information may be acquired.

If the number of users in the acquired user information still does not satisfy the predetermined number after expanding the attribute criteria with all relevant attribute values from the access attribute information, then the content provision unit 14 changes the attribute values to the attribute values belonging to the upper-level attribute categories above the one or more attribute categories specified in the attribute criteria. The content provision unit 14 then acquires user information matching the modified attribute criteria from the user information storage unit 11.

If the acquired number of users is at least equal to the predetermined number, then a content acquisition method is generated. The content acquisition method includes information such as the attribute criteria, access information, and content information, which indicates the offered content in the content provision request. The user IDs and addresses registered in the extracted user information are then used to transmit the content acquisition method to respective user client device 3.

The user client device 3 transmits a content acquisition request to the access acquisition unit 15.

The access acquisition unit 15 redirects the received acquisition request to the service providing device 2. Alternatively, the access acquisition unit 15 may acquire the requested content from the service providing device 2 on the basis of the received acquisition request, and then transmit the acquired content to the user client device 3.

As a result of the access acquisition unit 15 conducting a redirect process or a proxy process with respect to the content acquisition request received from the user client device 3, the requested content is transmitted to the user client device 3.

In addition, the access acquisition unit 15 generates access attribute information on the basis of the content information and attribute criteria included in the received content acquisition request. Then, on the basis of the attribute criteria and user ID included in the content acquisition request, the access acquisition unit 15 checks whether or not the attribute values specified in the attribute criteria are set in the user information for that user, and if so, increments the access count of each corresponding attribute value in the access attribute information.

Alternatively, the access acquisition unit 15 may generate access attribute information by acquiring, from the service providing device 2, the user IDs and attribute information regarding the users who have accessed the content.

By such processes, the user information management device 1 is able to provide the user client device 3 with a content acquisition method prompting a user to access content offered by the service providing device 2, while preserving user anonymity.

Hereinafter, embodiments of the user information management device 1 will be described in further detail.

A first embodiment will now described for the case of a redirect process, wherein the service providing device 2 specifies content information in the form of a content URL, and wherein the access information in the content acquisition method specifies the access acquisition unit 15 of the user information management device 1 as the access address.

FIG. 4 illustrates the flow of processing by the user information management device 1 in the first embodiment.

In the first and subsequent embodiments described herein, user information is asynchronously registered in the user information storage unit 11 by the following operations Sa and Sb executed in the user information management device 1.

Operation Sa: upon receiving a user information message transmitted from a user client device 3, the user information registration unit 13 acquires information indicating the user's attributes (e.g., attribute values) from the user information message. If there exist upper-level attribute categories above the attribute categories classifying the user attribute values included in the user information message, then the attribute values in the user information message are analyzed, and attribute values are determined for the upper-level attribute categories.

Operation Sb: the user information registration unit 13 generates user information wherein the information obtained from the user information message is assigned to a user ID. The generated user information is then stored in the user information storage unit 11.

In the case where content is being delivered for the first time, the user information management device 1 operates as follows in the first embodiment.

Operation S1: the content provision unit 14 receives a content provision request from the service providing device 2.

FIG. 5 illustrates an example of a content provision request in the first embodiment.

The content provision request in FIG. 5 includes: the message type, which indicates that the message is a content provision request; attribute criteria (Position=K Station); and content information (content URL: http://www.sample.com/sample.html), for example.

Operation S2: from the user information storage unit 11, the content provision unit 14 acquires user information that matches the attribute criteria in the content provision request that was received in operation 51. The content provision unit 14 then determines whether or not the acquired number of users is at least equal to a certain number (such as 8, for example). In the case where the user information is that illustrated in FIG. 2, the number of users matching the attribute criteria "Position=K Station" at this point would be five, which does not satisfy the certain number.

Operation S3: the content provision unit 14 determines that the number of users acquired in operation S2 does not satisfy the certain number. For this reason, the access attribute information in the access attribute information storage unit 12 is searched, using the content URL and the attribute criteria as search keys. The access counts for each attribute value set in the "Access Attribute Value" field corresponding to the content are then acquired. In the case where the information stored in the access attribute information storage unit 12 is that illustrated in FIG. 3, there is no access information for the content in the content provision request, and thus no attribute values or access counts corresponding to the attribute criteria "Position=K Station" are acquired. In other words, there are no attribute values that may be added to the attribute criteria as logical disjunction (OR) parameters.

Operation S4: the content provision unit 14 changes the abstraction level of the attribute criteria. More specifically, the content provision unit 14 uses the attribute value of the upper-level category attribute (Position (L1)) above the attribute category (Position) specified by the attribute criteria, and changes the attribute criteria to "Position=K Ward" (see FIG. 2). The content provision unit 14 then acquires user information matching the modified attribute criteria from the user information storage unit 11. In this example, according to the user information illustrated in FIG. 2, there are 11 users who match the attribute criteria "Position=K Ward", which is at least equal to the certain number (8).

Operation S5: from the user information obtained in operation S4, the content provision unit 14 uses the addresses and user IDs to generate and transmit a content acquisition method to each address.

FIG. 6 illustrates an example of a content acquisition method message in the first embodiment.

The content acquisition method message illustrated in FIG. 6 includes: the message type, which indicates that the message provides a content acquisition method; and access information (e.g., an access URL). The following are specified in the access information: content information for the content to be provided (e.g., a content URL); attribute criteria (Position=K Station); the corresponding user ID; and access address (e.g., the URL of the access acquisition unit 15).

Operation S6: the access acquisition unit 15 receives a content acquisition request message from a user client device 3.

FIG. 7 illustrates an example of a content acquisition request message in the first embodiment.

The content acquisition request message illustrated in FIG. 7 includes: the message type, which indicates that the message is a content acquisition request; content information (e.g., a content URL); attribute information, and a user ID, for example.

Operation S7: the access acquisition unit 15 transmits the content URL to the user client device 3 that transmitted the content acquisition request, and redirects the acquisition request to the service providing device 2.

Operation S8: the user client device 3 uses the content URL received from the access acquisition unit 15 to issue a content acquisition request to the service providing device 2.

Operation S9: using the user ID and attribute category (Position) in the attribute criteria that were included in the content acquisition request received in operation S6, the access acquisition unit 15 acquires the user's attribute values from the user information in the user information storage unit 11.

Operation S10: the access acquisition unit 15 increments the access counts of the attribute values acquired in operation S9, using the content information (e.g., the content URL) and attribute criteria (e.g., the attribute category and the attribute value) that were included in the content acquisition request received in operation S6 as keys.

At this point, consider the case where the value "K Daishi Station" is given as the attribute value for the attribute category (Position) for the user who transmitted the content acquisition request in operation S6. In this case, the attribute value "K Daishi Station" is obtained from the user information of the accessing user, and its corresponding access count, which is set in the "Access Attribute Value" field of the content information in the access attribute information, is incremented and set to 1.

FIG. 8 is a diagram for explaining how access attribute values are added. In the example access attribute information illustrated in FIG. 8, the value "K Daishi Station (1)" has been added to the "Access Attribute Value (Access Count)" field corresponding to particular content information (e.g., a content URL).

In cases where the above content is being delivered for the second and subsequent times, the user information management device 1 operates as follows.

The processing for delivering content for the second time is nearly identical to the processing in the above operations S1 to S10 for delivering content for the first time. In particular, since the processing in operation 51 and operations S5 to S10 is substantially the same, further description of such processing is herein omitted. The processes that differ will now be described.

Operation S2': After operation S1, the content provision unit 14 acquires user information from the user information storage unit 11 that matches the attribute criteria received in operation S1, and determines whether or not the number of users is at least equal to a certain number. In the case of the user information illustrated in FIG. 2, there exist five users for whom "Position=K Station" is true, which is not at least equal to the certain number.

Operation S3': After operation S2', since the number of acquired users does not satisfy the certain number, the content provision unit 14 uses the access attribute information in the access attribute information storage unit 12 as a basis for acquiring the attribute values and access counts of users who accessed the content, using the content URL and the attribute criteria as search keys.

FIG. 9 illustrates an example of access attribute information after initial content provision. In the example access attribute information illustrated in FIG. 9, the access attribute values of the attribute criteria (Position=K Station) for the offered content (content URL: http://www.sample.com/sample.html) are as follows: the access count of the attribute value "K Daishi Station" is four persons, and the access count of the attribute value "K Stadium" is one person.

Operation S4': After operation S3', the content provision unit 14 adds the attribute value with the highest access count (K Daishi Station) to the attribute criteria, and acquires user information from the user information storage unit 11 that matches the expanded attribute criteria "Position=K Ward or Position=K Daishi Station". For the example user information in FIG. 2, there exist eight users who satisfy the attribute criteria "Position=K Ward or Position=K Daishi Station", which is at least equal to the certain number.

At this point, if the number of users matching the attribute criteria does not satisfy the certain number, then the attribute value with the next highest access count (K Stadium) is added to the criteria, and matching user information is acquired.

If the number of matching users still does not satisfy the certain number after expanding the attribute criteria with all addable attribute values, then the process is returned to the above operation S4, and the abstraction level of the attribute criteria is changed.

In so doing, the number of users set to receive a transmitted content provision method becomes at least equal to a certain number, thereby making it possible to issue a content provision method to an optimal range of users while preserving user anonymity.

Meanwhile, when delivering content for the second and subsequent times, supplementary access information is no longer obtained for the attribute values that were not added to the attribute criteria as logical disjunction (OR) parameters. For this reason, the access acquisition unit 15 may be configured to delete access information after a certain amount of time, in order to preserve the freshness of the information.

Figure 10:
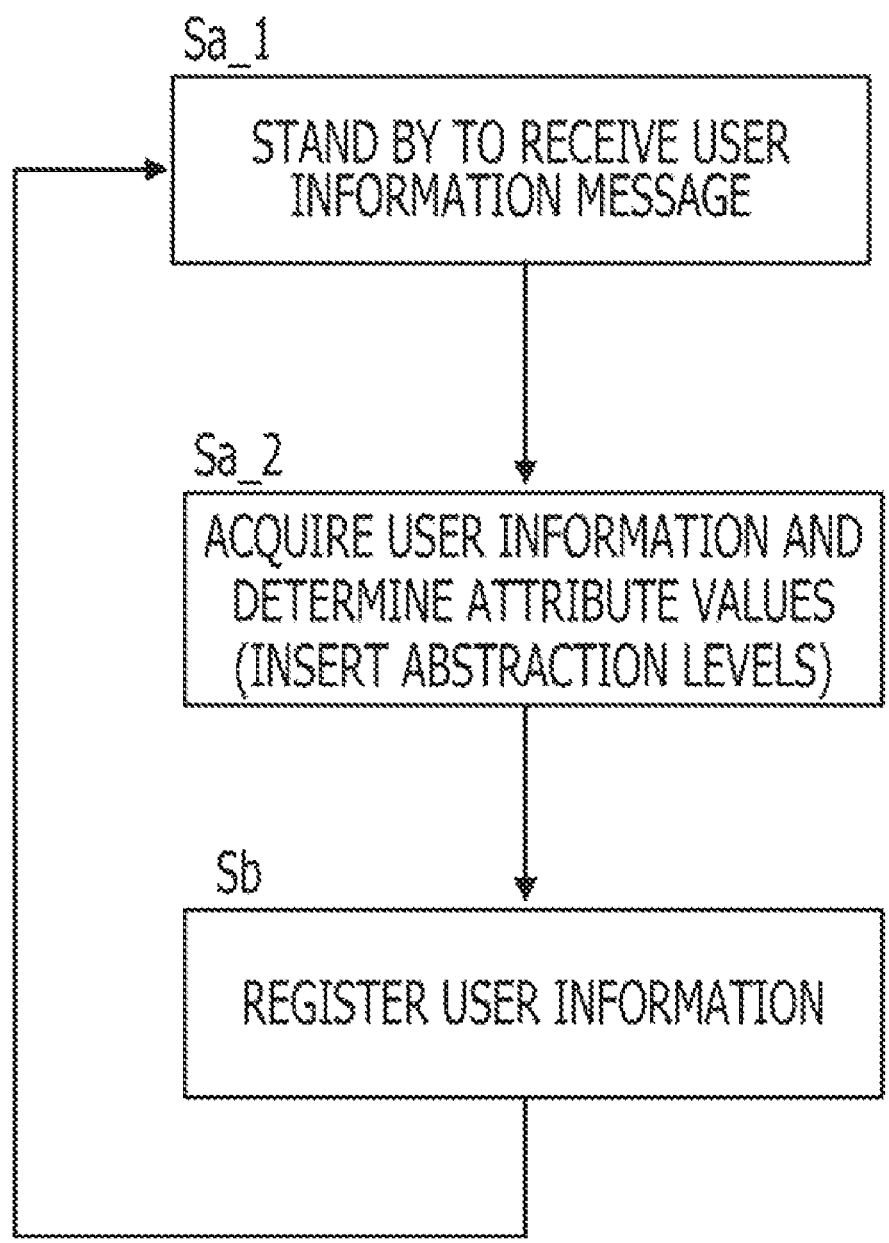
FIG. 10 illustrates the processing flow of a user information registration unit in the first embodiment.

FIG. 10 illustrates the processing flow of the user information registration unit in the first embodiment. The reference symbols for the processing operations illustrated in FIG. 10 correspond to the reference symbols (Sa, Sb) for the operations illustrated in FIG. 4, as well as in FIGS. 19 and 21 hereinafter described.

In the processing flow illustrated in FIG. 10, the user information registration unit 13 stands by to receive a user information message from a user client device 3 (operation Sa_1). Upon receiving a user information message, the user information registration unit 13 acquires information indicating the user's attributes (e.g., attribute values) from the received user information message. The user attribute values included in the user information message are analyzed, and attribute values are determined for attribute categories existing on higher abstraction levels (operation Sa_2).

The user information registration unit 13 stores the user information obtained from the user information message in the user information storage unit 11 (operation Sb).

Figure 11:
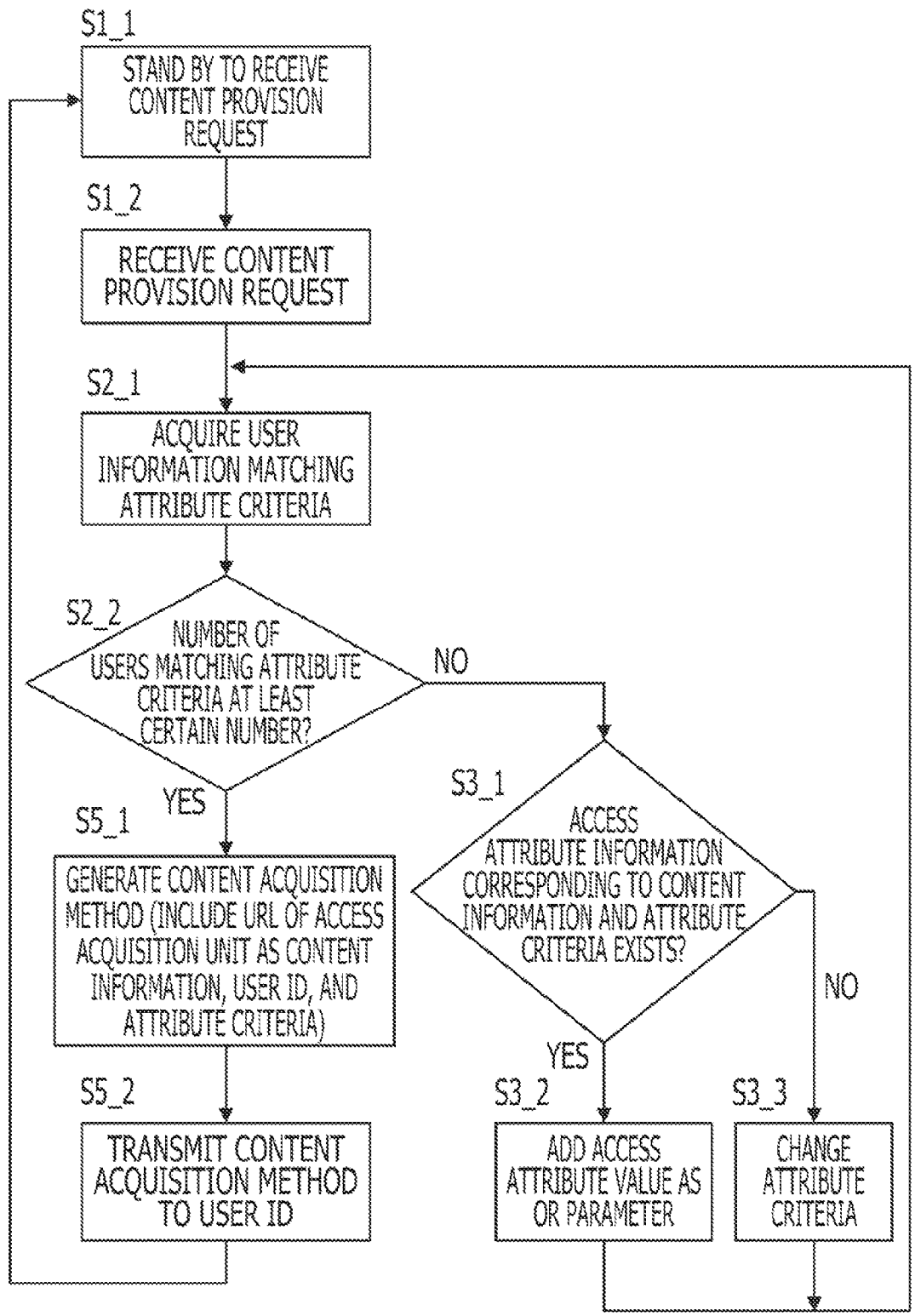
FIG. 11 illustrates the processing flow of a content provision unit in the first embodiment.

FIG. 11 illustrates the processing flow of the content provision unit 14 in the first embodiment. The reference symbols for the processing operations illustrated in FIG. 11 correspond to the reference symbols for the respective operations illustrated in FIG. 4, as well as in FIGS. 19 and 21 hereinafter described.

In the processing flow illustrated in FIG. 11, the content provision unit 14 stands by to receive a content provision request message from the service providing device 2 (operation S1_1). Upon receiving a content provision request message, the content provision unit 14 acquires a content provision request including content information (e.g., a content URL) and attribute criteria (operation S1_2).

From the user information storage unit 11, the content provision unit 14 acquires user information that matches the attribute criteria (operation S2_1), and determines whether or not the number of users matching the attribute criteria is at least equal to a certain number (operation S2_2).

If the number of users matching the attribute criteria is not at least equal to the certain number (operation S2_2: N), then the content provision unit 14 checks the access attribute information storage unit 12 for the existence of access attribute information corresponding to the content information (e.g., the content URL) and the attribute criteria (operation S3_1). If relevant access attribute information does exist (operation S3_1: YES), then the content provision unit 14 adds the attribute value with the highest access count in the access attribute information to the attribute criteria as a logical disjunction (OR) parameter (operation S3_2). If relevant access attribute information does not exist (operation S3_1: NO), then the content provision unit 14 changes the attribute values specified by the attribute criteria to the attribute values of their corresponding upper-level attribute categories (operation S3_3).

On the other hand, if the number of users matching the attribute criteria is at least equal to the certain number (operation S2_2: YES), then the content provision unit 14 generates a content acquisition method message (operation S5_1). The content acquisition method message includes the URL (e.g., access address) of the access acquisition unit 15 set as the access information (e.g., the access URL), in addition to content information (e.g., the content URL), a user ID, and the attribute criteria. The content provision unit 14 then transmits the content acquisition method message to the corresponding user ID (operation S5_2).

Figure 12:
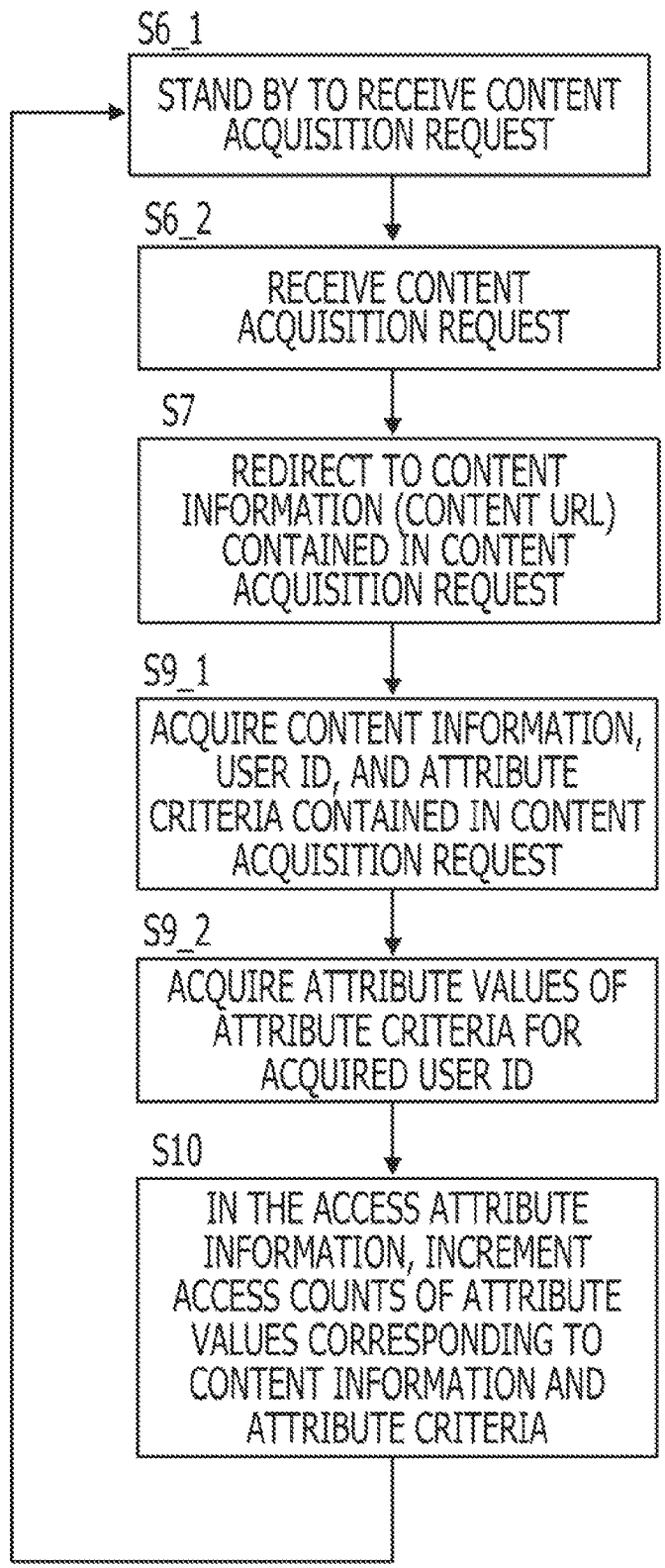
FIG. 12 illustrates the processing flow of an access acquisition unit in the first embodiment.

FIG. 12 illustrates the processing flow of the access acquisition unit 15 in the first embodiment. The reference symbols for the processing operations illustrated in FIG. 12 correspond to the reference symbols for the respective operations illustrated in FIG. 4, as well as in FIGS. 19 and 21 hereinafter described.

In the processing flow illustrated in FIG. 12, the access acquisition unit 15 stands by to receive a content acquisition request message from a user client device 3 (operation S6_1). Upon receiving a content acquisition request message, the access acquisition unit 15 acquires a content acquisition request (operation S6_2), and redirects the user to the content information (e.g., the content URL) included in the received content acquisition request (operation S7, S8).

The access acquisition unit 15 then acquires the content information (e.g., the content URL), user ID, and attribute criteria included in the received content acquisition request (operation S9_1), and from the user information corresponding to the acquired user ID, acquires the attribute values for the one or more attribute categories specified by the attribute criteria (operation S9_2). The access acquisition unit 15 increments the access counts of the attribute values corresponding to the content information (e.g., the content URL) and the attribute criteria in the access attribute information (operation S10).

A second embodiment will now be described for the case wherein a service ID is specified as the content information, and wherein the access information included in the content acquisition method specifies the access acquisition unit 15 of the user information management device 1.

The processing flow for the case of the second embodiment is similar to the case of the first embodiment illustrated in FIG. 4.

However, in the second embodiment, a service ID identifying a service of the service providing device 2 is used as the content information.

FIG. 13 illustrates an example of a content provision request message in the second embodiment. In the content provision request illustrated in FIG. 13, the content information is specified in the form of a service ID that identifies a particular service.

In the second embodiment, in operation S1 illustrated in FIG. 4, the content provision unit 14 receives a content provision request message including content information specifying a service ID.

Subsequently, in operation S3, the content provision unit 14 uses the attribute criteria and the service ID in the content provision request received from the service providing device 2 as a basis for acquiring relevant attribute values and their access counts from the access attribute information. Also, in operation S5, the content provision unit 14 generates a content acquisition method in which the service ID is specified as the content information.

For this reason, in operation S6, the access acquisition unit 15 receives, from a user client device 3, a content acquisition request message including access information in which the content is specified by a service ID.

FIG. 14 illustrates an example of a content acquisition request message in the second embodiment. In the access information of the content acquisition request illustrated in FIG. 14, a service ID is set as the content information.

Additionally, the access acquisition unit 15 generates access attribute information wherein the service ID is set as the content information.

FIG. 15 illustrates an example of access attribute information in the second embodiment. Similarly to the above, in the access attribute information illustrated in FIG. 15, service IDs are set in the "Content" fields where content information is set.

A third embodiment will now be described for the case wherein a content ID classified under a predetermined category is specified as the content information, and wherein the access information included in the content acquisition method provided to the user client device 3 specifies the access acquisition unit 15 of the user information management device 1.

The processing flow in the case of the third embodiment is similar to the case of the first embodiment illustrated in FIG. 4.

However, in the third embodiment, a content ID identifying content set in a particular category is used as the content information.

FIG. 16 illustrates an example of a content provision request message in the third embodiment. In the content provision request illustrated in FIG. 16, the content information is specified in the form of a content ID.

In the third embodiment, in operation S1 illustrated in FIG. 4, the content provision unit 14 receives a content provision request including content information specifying a content ID.

Subsequently, in operation S3, the content provision unit 14 uses the attribute criteria and the content ID in the content provision request received from the service providing device 2 as a basis for acquiring relevant attribute values and their access counts from the access attribute information.

In operation S5, the content provision unit 14 generates a content acquisition method in which the content ID is specified as the content information.

In operation S6, the access acquisition unit 15 receives, from a user client device 3, a content acquisition request including access information in which the content is specified by a content ID.

FIG. 17 illustrates an example of a content acquisition request message in the third embodiment. In the access information of the content acquisition request illustrated in FIG. 17, a content ID is set as the content information.

The access acquisition unit 15 generates access attribute information wherein the content ID is set as the content information.

FIG. 18 illustrates an example of access attribute information in the third embodiment. Similarly to the above, in the access attribute information illustrated in FIG. 18, content IDs are set in the "Content" fields where content information is set.

As described above, in a structure that delivers content groups with the same attribute criteria but different content URLs, a content provision request received from the service providing device 2 may include content information in the form of a service ID. In so doing, it becomes possible to transmit a content acquisition method to an optimal range of users, even when delivering the content for the first time.

Furthermore, instead of service IDs, content may be classified into categories and identified by content IDs. In a structure wherein a plurality of service providers (e.g., service providing device) deliver content belonging to the same categories, a content provision request received from a service providing device 2 may include content information specified in the form of a content ID. In so doing, it becomes possible to utilize access attribute information for the content categories.

A fourth embodiment will now be described for the case of a proxy process, wherein the service providing device 2 specifies a content URL as the content information, the access information included in the content acquisition method specifies the access acquisition unit 15 of the user information management device 1, and wherein the access acquisition unit 15 provides content by proxy.

Figure 19:
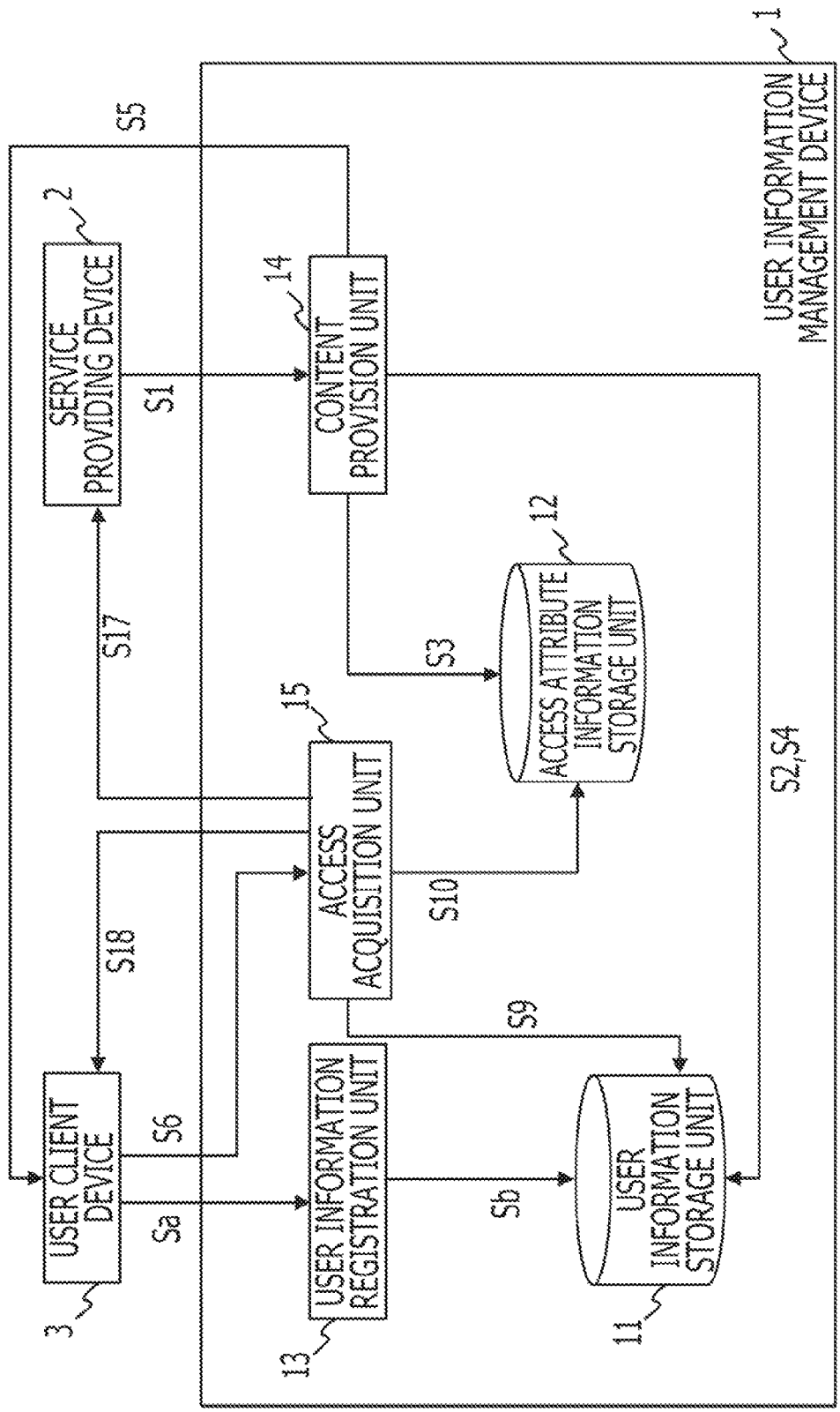
FIG. 19 illustrates the processing flow in the case of the fourth embodiment.

FIG. 19 illustrates the processing flow in the case of the fourth embodiment.

The processing flow in the case of the fourth embodiment is nearly identical to the case of the first embodiment illustrated in FIG. 4. The processing operations illustrated in FIG. 19 correspond to identically-numbered processing operations illustrated in FIG. 4. However, in the fourth embodiment, the following operations S17 and S18 are conducted instead of the operations S7 and S8 illustrated in FIG. 4.

Operation S17: after operation S6, the access acquisition unit 15 uses the access information in the content acquisition request received from a user client device 3 as a basis for accessing the content URL of the service providing device 2, and acquires the requested content.

Operation S18: after operation S17, the access acquisition unit 15 transmits the acquired content to the user client device 3 that transmitted the acquisition request.

Figure 20:
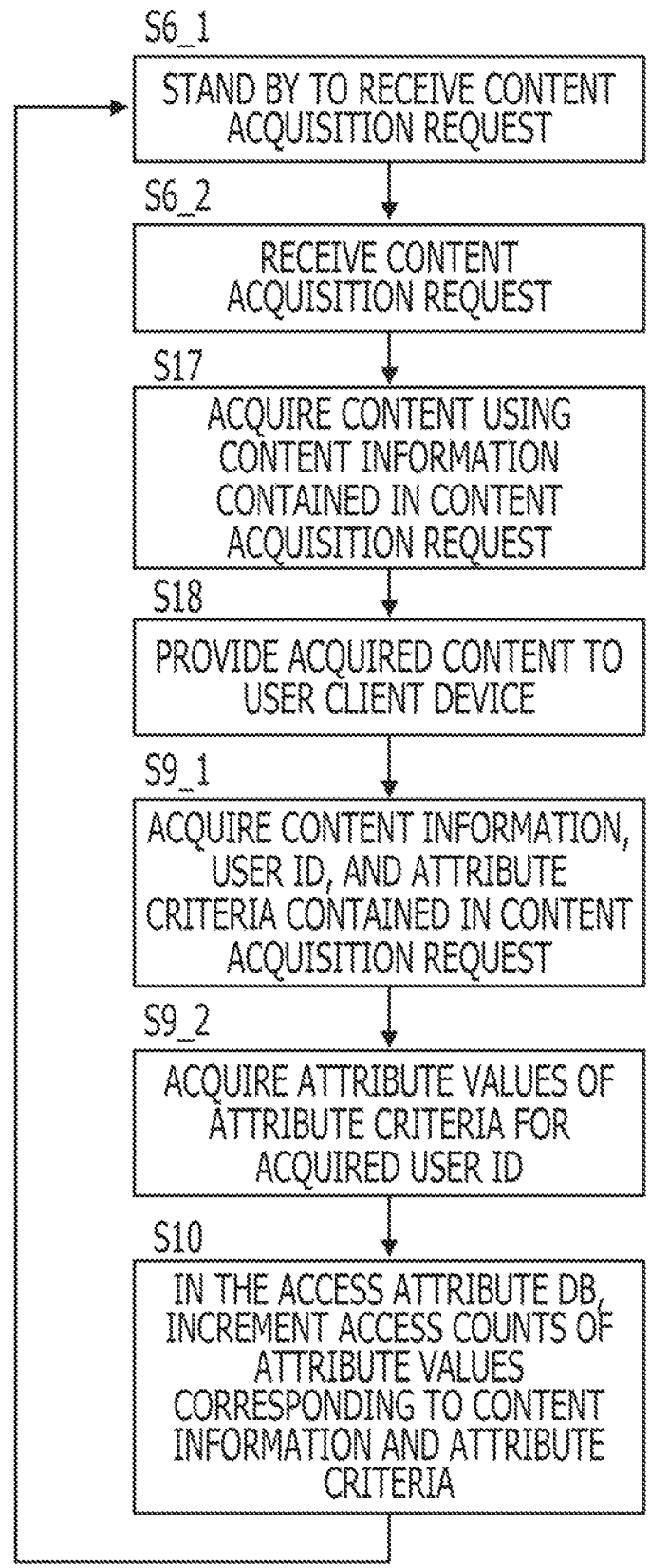
FIG. 20 illustrates the processing flow of an access acquisition unit in the fourth embodiment.

FIG. 20 illustrates the processing flow of the access acquisition unit 15 in the fourth embodiment. The reference symbols for the processing operations illustrated in FIG. 20 correspond to the reference symbols for respective operations illustrated in FIGS. 4, 19, and 21, as well as to the reference symbols for respective operations in the processing flow illustrated in FIG. 12. For this reason, further description of processing operations with identical reference symbols is herein omitted.

In the processing flow illustrated in FIG. 20, the access acquisition unit 15 uses the content information (e.g., the content URL) included in the content acquisition request to acquire content from the service providing device 2 (operation S17). Subsequently, the access acquisition unit 15 transmits the acquired content to a user client device 3 (operation S18).

In the process illustrated in the fourth embodiment, it is likewise possible for the service providing device 2 to specify content information in the form of a service ID or a content ID, similarly to the second and third embodiment described earlier.

A fifth embodiment will now be described for the case wherein the access information included in the content acquisition method specifies the access address of content stored on the service providing device 2.

Figure 21:
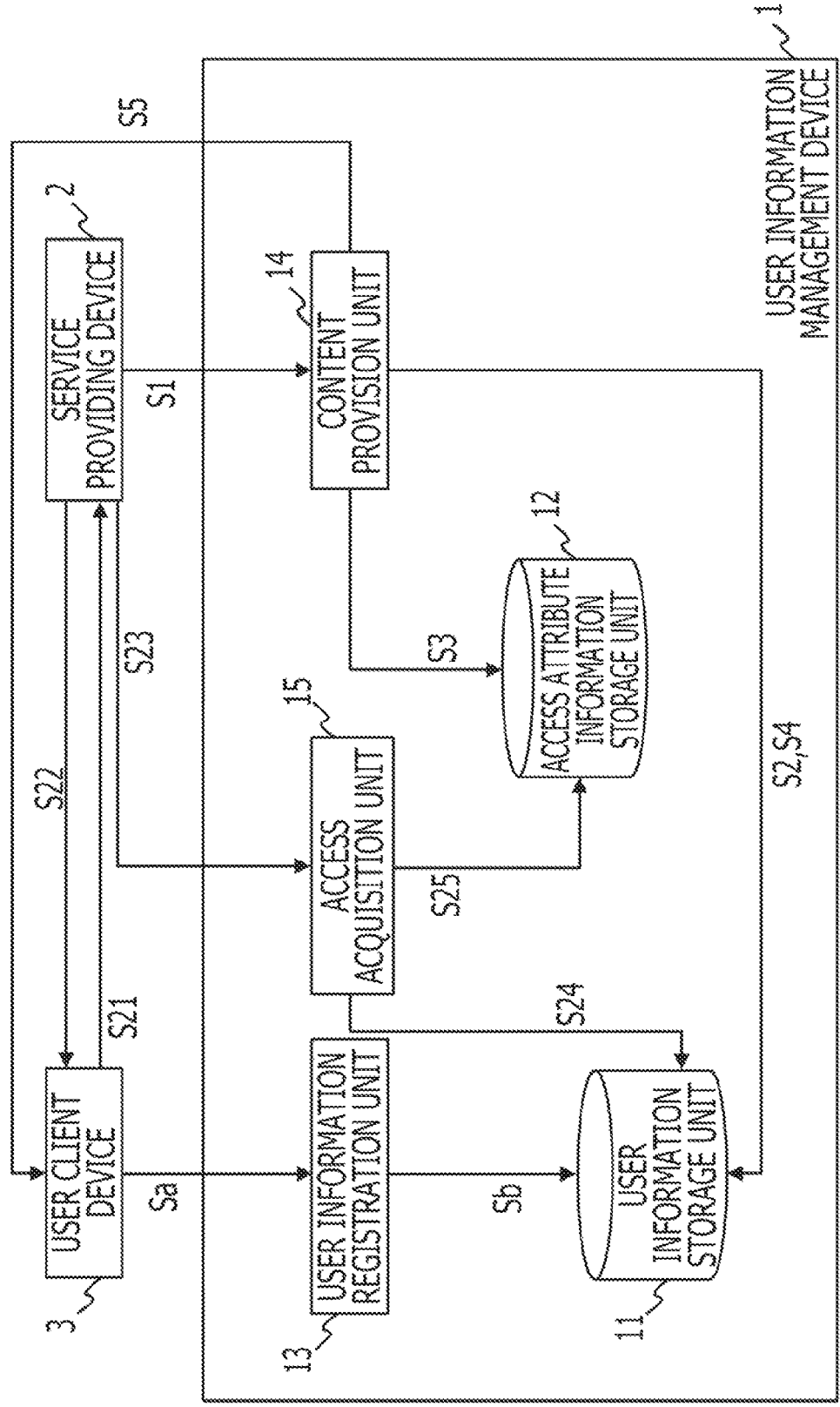
FIG. 21 illustrates the processing flow in the case of the fifth embodiment.

FIG. 21 illustrates the processing flow in the case of the fifth embodiment. In FIG. 21, the processing operations for the case of the fifth embodiment correspond to identically-numbered processing operations illustrated in FIG. 4. However, in the fifth embodiment, the operations S21 to S25 are conducted instead of the operations S6 to S10 illustrated in FIG. 4.

In operation S5 illustrated in FIG. 21, the content provision unit 14 uses the addresses and user IDs from the user information that was obtained in operation S4 to generate and transmit a content acquisition method message to each user address. Each content acquisition method message includes access information specifying the access address of content stored on the service providing device 2.

FIG. 22 illustrates an example of a content acquisition method message in the fifth embodiment. The content acquisition method message illustrated in FIG. 22 includes: the message type, which indicates that the message provides a content acquisition method; and access information (e.g., an access URL). The access information includes: attribute criteria (Position=K Station); the user ID of the user being provided with the content; the content URL; and the URL of the service providing device 2 (http://www.example.com/sample.html), which expresses the access address.

In operation S21 illustrated in FIG. 21, after operation S5, the service providing device 2 receives a content acquisition request message from a user client device 3.

In operation S22, after operation S21, the service providing device 2 transmits the requested content to the corresponding user client device 3.

In operation S23, after operation S22, the access acquisition unit 15 receives, from the service providing device 2, an access information message with respect to the offered content according to the content provision request.

FIG. 23 illustrates an example of an access information message in the fifth embodiment. The access information message includes: content information (e.g., a content URL); attribute criteria; and the user IDs of accessing users.

In operation S24, after operation S23, the access acquisition unit 15 uses the user IDs and one or more attribute categories specified by the attribute criteria included in the received access information message, and acquires the attribute values of each user.

In operation S25, after operation S24, the access acquisition unit 15 increments the access counts of relevant attribute values in the access information in the access attribute information storage unit 12, using the content information (e.g., the content URL) and attribute criteria that were included in the access information message received in operation 23 as keys.

A sixth embodiment will now be described for the case wherein a plurality of attribute criteria are specified in the content provision request from the service providing device 2, and wherein the processing flow of the access acquisition unit 15 is similar to the processing flow in the first embodiment. Consequently, FIG. 4 will be used to describe different processes.

In operation S1 of the sixth embodiment, the content provision unit 14 receives a content provision request from the service providing device 2 including: attribute criteria (Position=K Station & Interests=Baseball); and content information (e.g., a content URL).

If the content is being provided for the first time, then when changing the abstraction level of the attribute criteria in operation S4, the content provision unit 14 successively changes the attribute categories for the plurality of attribute criteria to their corresponding upper-level attribute categories. The content provision unit 14 successively changes the attribute categories until the number of users from the user information storage unit 11 who match the attribute criteria becomes at least a certain number.

For example, the content provision unit 14 may change the attribute value of the first attribute category "Position" to that of the upper-level attribute category "Position (L1)", thereby changing the attribute criteria to "Position=K Ward & Interests=Baseball". The content provision unit 14 may then acquire a number of users matching the modified attribute criteria, and determine whether or not that number is at least equal to a certain number.

If the determination results indicate that the number of users matching the attribute criteria is not at least equal to the certain number, then the content provision unit 14 modifies the attribute criteria so as to raise the abstraction level of just one attribute category in the attribute criteria. More specifically, after determining the number of users matching the attribute criteria "Position=K Ward & Interests=Baseball", the content provision unit 14 may revert the abstraction level of the first attribute category back to its original level, and only change the attribute value of the second attribute value to that of the corresponding upper-level attribute category. The content provision unit 14 may then determine the number of users matching the attribute criteria "Position=K Station & Interests=Sports".

Alternatively, the content provision unit 14 may modify the attribute criteria so as to successively raise the abstraction levels of the attribute categories in the attribute criteria. More specifically, the content provision unit 14 may change the attribute value "Baseball" of the second attribute category "Interests" to the upper-level attribute value "Sports", and determine whether or not the number of users matching the modified attribute criteria "Position=K Ward & Interests=Sports" is at least equal to a certain number.

If the number of matching users still does not satisfy the certain number after changing the abstraction levels of the attribute categories in the attribute criteria, the content provision unit 14 may additionally raise the abstraction levels of the plurality of attribute categories to upper-level attribute categories (such as Position (L2)), and acquire a number of users by using the modified attribute criteria "Position=K City & Interests=Baseball".

In addition, in operation S9, the access acquisition unit 15 uses the user ID and attribute criteria (Position=K Station & Interests=Baseball) included in the content acquisition request received from a user client device 3, and from the user information storage unit 11 acquires the attribute values for all attribute categories (e.g., Position and Interests) specified by the attribute criteria of the user ID.

In operation S10, the access acquisition unit 15 registers access attribute information in the access attribute information storage unit 12. The access attribute information is set with content information (e.g., the content URL), attribute criteria (Position=K Station & Interests=Baseball), and attribute values (K Daishi Station & Baseball).

FIG. 24 illustrates an example of access attribute information in the sixth embodiment.

In the case where a plurality of attribute categories are specified in the attribute criteria as in the example access attribute information illustrated in FIG. 24, the access acquisition unit 15 acquires the respective attribute values, and manages the access attribute values separately for each combination of attribute values. Combinations of attribute values are set in the "Access Attribute Value" field of the access attribute information.

As illustrated by way of example in FIG. 24, a user may have previously accessed particular content, and that user's combination of attribute values "K Daishi Station & Softball" may be set in the "Access Attribute Value" field of the access attribute information. In this case, when another user with the attribute values "Position=K Daishi Station, Interests=Soccer" accesses that content, the access acquisition unit 15 may set the access attribute value "K Daishi Station & Soccer" separately from "K Daishi Station & Softball", and respectively manage access counts for each access attribute value.

Meanwhile, if the access acquisition unit 15 changed the abstraction levels of the attribute categories in operation S4 (for example, if the attribute value was changed from "Baseball" to "Sports" for the attribute category "Interests"), then the access acquisition unit 15 may similarly register "K Daishi Station & Softball" as an attribute value, as illustrated in FIG. 24.

Figure 25:
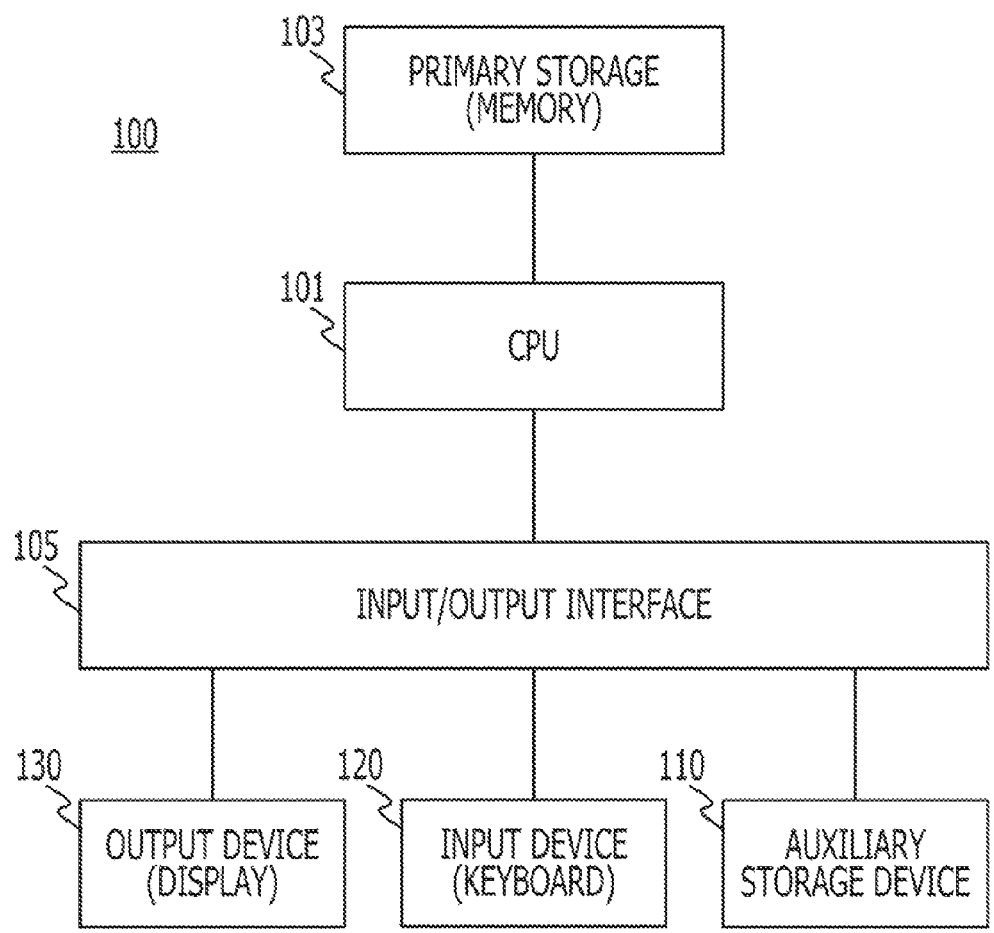
FIG. 25 illustrates an example hardware configuration of a user information management device.

FIG. 25 illustrates an example hardware configuration of the user information management device 1.

As illustrated in FIG. 25, the user information management device 1 may be realized by a computer 100 provided with a CPU 101, a primary storage unit (memory) 103, an input/output interface 105, an auxiliary storage device 110, an input device (such as a keyboard) 120, and an output device (such as a display) 130.

In addition, the user information management device 1 may also be realized by a program executable by the computer 100. In this case, a program stating the specific processing operations of the functions to be included in the user information management device 1 may be provided. As a result of the computer 100 executing the provided program, the processing functions of the user information management device 1 described in the foregoing is realized on the computer 100.

In other words, components of the user information management device 1 such as the user information registration unit 13, the content provision unit 14, and the access acquisition unit 15 may be realized by the program, while the user information storage unit 11 and the access attribute information storage unit 12 may be realized by the auxiliary storage device 110.

The computer 100 may also read the program directly from a portable recording medium and execute processing in accordance with the program. In addition, the computer 100 may also successively receive program instructions from a server computer, and execute corresponding processing each time such program instructions are received.

Furthermore, the program may be recorded onto a recording medium readable by the computer 100.

When content is provided on the basis user attribute information, the anonymity of users accessing such content might not be protected in cases where there is a low number of users matching the attribute criteria for content provision set by the service provider. However, according to the foregoing user information management device, the range of attributes specified by the attribute criteria is automatically expanded in such cases. The expanded attribute criteria is used to extract at least a certain number of users, and then a content acquisition method is provided to the extracted users. In so doing, content may be provided to at least a certain number of users such that the anonymity of accessing users may be preserved, and a content provision system based on user attributes that also protects user privacy may be realized.

Furthermore, according to the foregoing user information management device, the range of attribute criteria is not expanded by raising the abstraction level of the specified attribute information (e.g., by abstracting the attribute criteria), but rather by adopting the attribute value with the highest user access count in the same attribute information. In so doing, the range of users to be provided with content is optimized, and content is not provided to users with little need for the content.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A user information management device configured to manage user information regarding content provision service users, and to provide a content acquisition method to a user client device, the user information management device comprising:

a user information storage unit configured to store user information for each user, the user information including an address of the content acquisition method and attribute information including a user's attributes using attribute values classified into predetermined attribute categories;

an access attribute information storage unit configured to store access attribute information for each set of content, the access attribute information including attribute criteria specifying the attributes of users to be provided with the content and access attribute values indicating user access counts for each attribute value specified by the attribute criteria based on the attribute values included in the user information regarding users who transmitted acquisition requests for the content;

a content provision unit that, acquires, from the user information storage unit, a content provision request including content information, which indicates content to be provided to users and the attribute criteria for that content, acquires, from the user information storage unit, user information that matches the attribute criteria included in the content provision request, wherein when the number of users corresponding to the extracted user information does not satisfy a predetermined number, the content provision unit specifies attribute values one at a time in order of highest access count from the access attribute values in the access attribute information stored in the access attribute information storage unit, and acquires user information that matches expanded attribute criteria to which the specified attribute value has been added as a logical disjunction parameter, when the number of users corresponding to the acquired user information does satisfy the predetermined number, the content provision unit generates a content acquisition method including access information for accessing the content indicated by the content information, and transmits the generated content acquisition method to addresses respectively extracted from the acquired user information; and an access acquisition unit configured such that, upon receiving a content acquisition request from the user client device including content information, attribute criteria, and user attribute information, the access acquisition unit causes the user client device to acquire the content requested in the content acquisition request, totals the user access counts for each attribute value specified by the attribute criteria of the content in the content acquisition request from the user attribute information included in the content acquisition request, generates access attribute information including the totaled access counts for each attribute value, and stores the generated access attribute information in the access attribute information storage unit.

2. The device according to claim 1,
wherein the content information is information including one or more
full or partial information regarding the network location of the content to be provided to users,
information uniquely identifying the content, and
information uniquely identifying a service that provides the content.

3. The device according to claim 1,
wherein the content provision unit generates the content acquisition method in a form of information including content information regarding the content to be provided and access information wherein the access acquisition unit is specified as the access address.

4. The device according to claim 2,
wherein the content provision unit generates the content acquisition method in a form of information including content information regarding the content to be provided and access information wherein the access acquisition unit is specified as the access address.

5. The device according to claim 1,
wherein the content provision unit generates the content acquisition method in a form of information including content information regarding the content to be provided and access information wherein a service providing device storing the content is specified as the access address.

6. The device according to claim 2,
wherein the content provision unit generates the content acquisition method in a form of information including content information regarding the content to be provided and access information wherein a service providing device storing the content is specified as the access address.

7. The device according to claim 1,
wherein upon receiving the content acquisition request, the access acquisition unit redirects the content acquisition request to a service providing device storing the content.

8. The device according to claim 2,
wherein upon receiving the content acquisition request, the access acquisition unit redirects the content acquisition request to a service providing device storing the content.

9. The device according to claim 1,
wherein upon receiving the content acquisition request, the access acquisition unit acquires the content requested in the content acquisition request from a service providing apparatus, and transmits the acquired content to the user client device that transmitted the content acquisition request.

10. The device according to claim 2,
wherein upon receiving the content acquisition request, the access acquisition unit acquires the content requested in the content acquisition request from a service providing apparatus, and transmits the acquired content to the user client device that transmitted the content acquisition request.

11. The device according to claim 5,
wherein upon receiving a content acquisition request wherein the service providing device is specified as the access address, the access acquisition unit acquires access information from the service providing device including information regarding the content corresponding to the content acquisition request and information regarding the user who transmitted the content acquisition request, and
generates access attribute information based on the access information.

12. The device according to claim 6,
wherein upon receiving a content acquisition request wherein the a service providing device is specified as the access address, the access acquisition unit acquires access information from the service providing device including information regarding the content corresponding to the content acquisition request and information regarding the user who transmitted the content acquisition request, and
generates access attribute information based on the access information.

13. A processing method executed by a computer provided with a user information storage unit and an access attribute information storage unit for the purpose of managing user information regarding content provision service users, and providing a content acquisition method to a user client devices, the method comprising:

storing user information for each user in the user information storage unit, the user information including an address of the content acquisition method and attribute information including a user's attributes using attribute values classified into predetermined attribute categories;

storing access attribute information for each set of content in the access attribute information storage unit, the access attribute information including attribute criteria specifying the attributes of users to be provided with the content and access attribute values indicating user access counts for each attribute value specified by the attribute criteria based on the attribute values included in the user information regarding users who transmitted acquisition requests for the content;

acquiring a content provision request including content information, which indicates content to be provided to users and the attribute criteria for that content;

acquiring, from the user information storage unit, user information that matches the attribute criteria included in the content provision request;

when the number of users corresponding to the extracted user information does not satisfy a predetermined number, specifying attribute values one at a time in order of highest access count from the access attribute values in the access attribute information stored in the access attribute information storage unit, and acquiring user information that matches expanded attribute criteria to which the specified attribute value has been added as a logical disjunction parameter;

when the number of users corresponding to the acquired user information does satisfy the predetermined number, generating a content acquisition method including access information for accessing the content indicated by the content information, and transmitting the generated content acquisition method to addresses respectively extracted from the acquired user information;

upon receiving a content acquisition request from the user client device including content information, attribute criteria, and user attribute information, causing the user client device to acquire the content requested in the content acquisition request;

totaling the user access counts for each attribute value specified by the attribute criteria of the content in the content acquisition request from the user attribute information included in the content acquisition request; and generating access attribute information including the totaled access counts for each attribute value, and storing the generated access attribute information in the access attribute information storage unit.

14. A computer-readable non transitory storage medium storing a user information management program that causes a computer provided with a user information storage unit and an access attribute information storage unit to manage user information regarding content provision service users, and to provide a content acquisition method to a user client devices, the user information management program causing the computer to execute a process comprising:

storing user information for each user in the user information storage unit, the user information including an address of the content acquisition method and attribute information that including a user's attributes using attribute values classified into predetermined attribute categories;

storing access attribute information for each set of content in the access attribute information storage unit, the access attribute information including attribute criteria specifying the attributes of users to be provided with the content and access attribute values indicating user access counts for each attribute value specified by the attribute criteria based on the attribute values included in the user information regarding users who transmitted acquisition requests for the content;

acquiring a content provision request including content information, which indicates content to be provided to users and the attribute criteria for that content;

acquiring, from the user information storage unit, user information that matches the attribute criteria included in the content provision request;

when the number of users corresponding to the extracted user information does not satisfy a predetermined number, specifying attribute values one at a time in order of highest access count from the access attribute values in the access attribute information stored in the access attribute information storage unit, and acquiring user information that matches expanded attribute criteria to which the specified attribute value has been added as a logical disjunction parameter;

when the number of users corresponding to the acquired user information does satisfy the predetermined number, generating a content acquisition method including access information for accessing the content indicated by the content information, and transmitting the generated content acquisition method to addresses respectively extracted from the acquired user information;

upon receiving a content acquisition request from the user client device including content information, attribute criteria, and user attribute information, causing the user client device to acquire the content requested in the content acquisition request;

totaling the user access counts for each attribute value specified by the attribute criteria of the content in the content acquisition request from the user attribute information included in the content acquisition request; and generating access attribute information including the totaled access counts for each attribute value, and storing the generated access attribute information in the access attribute information storage unit.

* * * * *